UNITED STATES PATENT OFFICE.

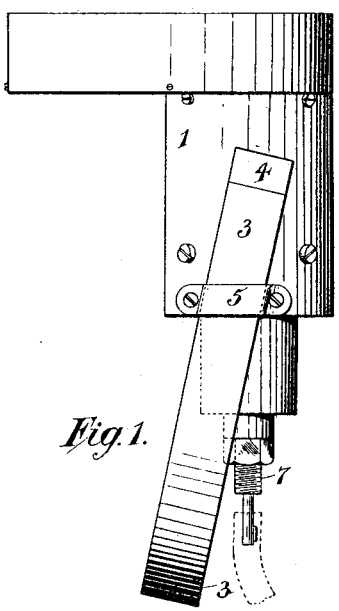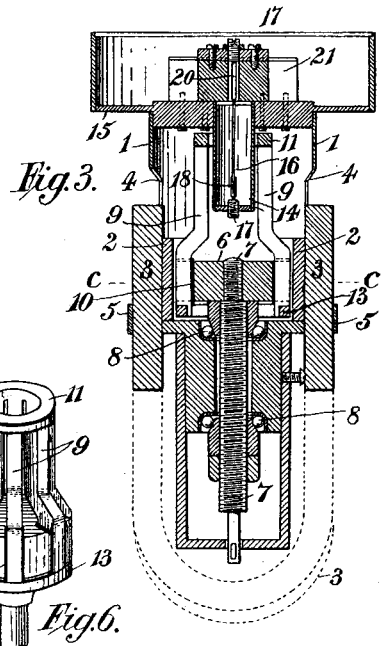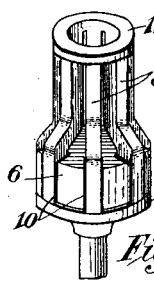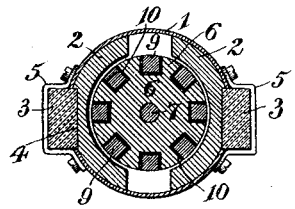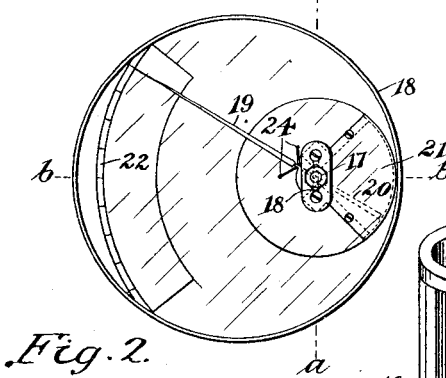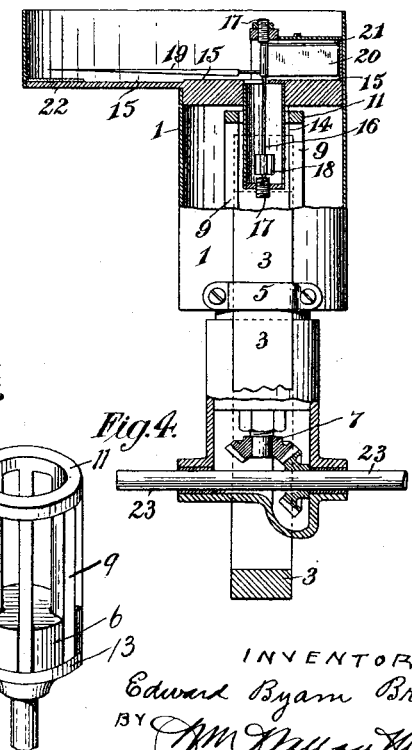

EDWARD BYAM BROWN, OF MELBOURNE, VICTORIA, AUSTRALIA.

TACHOMETER.

1,068,625.   Specification of Letters Patent.   Patented July 29, 1913.

Application filed January 18, 1912. Serial No. 671,779.

*To all whom it may concern:*

Be it known that I, EDWARD BYAM BROWN, a subject of the King of Great Britain and Ireland, residing at Melbourne, in the State of Victoria, Commonwealth of Australia, have invented a new and useful Improved Tachometer, of which the following is a specification.

This invention relates to an improved tachometer and refers to an instrument for the purpose of measuring or indicating speeds of rotation being applicable either for the measurement of speeds of rotation only or when such speeds of rotation are transferred into linear speeds as in speedometers for vehicles and the like.

This invention relates to tachometers containing permanent magnets and embodies the use of the magnetic effect of electric currents induced in conductors moving in a permanent magnetic field.

Hitherto tachometers or speed indicators embodying the use of the magnetic effect of electric currents induced in conductors moving in a permanent magnetic field have comprised for the most part those consisting of a volt meter used in combination with a dynamo with permanent magnets, the armature of which is caused to rotate at a speed which is a multiple of that required to be measured. In this volt meter the moving element which indicates the speed is operated against the tension of a controlling spring. Other instruments have also been constructed in which use is made of the torque due to eddy currents induced in a plate of metal pivoted over permanent rotating magnets, the movement of the said plate being also against the tension of a controlling spring. These instruments have been more or less unreliable in use, owing to the indicating mechanism being controlled by a spring which is subject to variations of temperature and other conditions, and to the permanent magnets being subject to change and variation due to vibration and other causes.

The object of this invention is to provide a tachometer or speed indicator which is not controlled by any spring device and in which the accuracy is not dependent upon the strength of the permanent magnet.

In an instrument constructed according to my invention the indicator automatically adapts itself to any alterations or variations in the said magnet, and there are no moving contacts in the electrical circuit (as in the dynamo and volt-meter type) so that there are no possibilities of error due to the variable resistance of moving contacts (such as the commutators and brushes) while the permanent magnet is not rotating (as in the eddy current type). Furthermore the sensitiveness of the instrument may be adjusted by altering the magnetic field so that the scale may be made to read over a wide range of speeds. I accomplish this object by providing an instrument which comprises a permanent magnet between the poles of which is set a rotating armature consisting of an iron core provided with projecting conductors forming an insulated continuous winding preferably in the form of a squirrel cage winding by which a secondary magnetic field is induced. This armature is mounted in suitable bearings and is caused to rotate by being connected to the moving body, the speed of which is to be recorded. Within the said projecting conductors is mounted a light shaft or spindle carrying a plate of soft iron the said shaft or spindle being co-linear with the axis of the armature. This plate of soft iron when in its normal position sets itself in the direction of the magnetic field between the poles of the permanent magnet and when the armature is rotated the said plate adapts itself to the resultant magnetic field, due to the permanent magnet and the currents in the revolving conductors. An indicating needle is attached to this shaft or spindle which indicates the direction of the said resultant magnetic field upon a graduated scale and consequently the speed of rotation.

The invention will now be more fully described aided by a reference to the accompanying sheets of drawings in which:—

Figure 1 is a full elevation of an instrument constructed according to my invention. Fig. 2 is a plan, and Fig. 3 a vertical section of the same on the line *a—a* Fig. 2, the permanent magnet being shown partly by dotted lines. Fig. 4 is a part side elevation and part vertical section on the line *b—b* Fig. 2, the means of connection to the rotating body being shown as bevel gearing. Fig. 5 is a horizontal section on the line *c—c*, Fig. 3. Fig. 6 is a detail perspective view of the rotating armature with its projecting conductors. Fig. 7 is a view similar to Fig. 6 showing a modified form of armature.

In constructing a tachometer or speed indicator according to my invention I provide a metal casing 1 within which are supported two iron pole pieces 2 on which is adjustably secured a permanent magnet 3. The ends of the said magnet 3 are adapted to project above the pole pieces 2 to any desired extent, to enable the strength of the magnetic field above the pole pieces 2 to be varied and for this purpose the magnet 3 is fitted within grooves 4 formed in the casing 1, and the pole pieces 2. The magnet 3 is adapted to slide within these grooves 4 and is held in place by clamps 5 or other convenient means. The magnet 3 may be set at an incline as shown in Fig. 1 so as to clear the connecting rotating shaft, or it may be bent or curved for the same purpose, or it may be straight, as shown in Fig. 4, when bevel connecting gearing is used.

Between the pole pieces 2 is mounted an iron armature comprising a core 6 supported upon a spindle 7 working in (preferably) ball bearings 8 within the casing 1. This spindle 7 is provided with means for connection to the rotating body the speed of which it is desired to measure, such as a flexible shaft as shown in Fig. 1, or bevel gearing as shown in Fig. 4.

The rotating armature is provided with any form of insulated continuous armature winding by which a secondary magnetic field is induced from the primary magnetic field. For this purpose the armature is provided with laterally projecting insulated conductors 9 (preferably of copper) which are accommodated within slots in the periphery of the core 6 being insulated therefrom by red fiber or other insulation 10. The upper extremities of these conductors are connected by a ring 11 and the lower extremities by a ring 13. The armature is thus similar to the well known squirrel cage armature winding used in induction motors. The projecting conductors 9 may be made parallel with the longitudinal axis or may be bent inward, as shown in the drawings, for the purpose of increasing the magnetic effect of the currents.

Within the projecting conductors 9 of the armature, but not connected therewith is a stationary cylinder 14 arranged vertically and connected to the top plate 15 of the instrument. Within this cylinder 14 is mounted a vertical spindle 16, the axis of which is colinear with the axis of the armature, being mounted in the adjustable bearings 17 which have a minimum of friction being preferably of jewels or hardened steel cups so that the indicator needle may easily move to and fro. This light spindle 16 is furnished at its lower end with a soft iron plate 18 and at its upper end with an indicating needle 19. For the purpose of damping the vibrations of the indicating needle 19, it is provided with a rearwardly projecting vane 20 which works or operates with small clearance in an inclosure or box 21 formed on the top plate 15 of the instrument. Means are provided for balancing the moving element comprising the indicator needle 19, the vane 20, the shaft 16 and soft iron plate 18 which consists of wires 24 or the like upon the said needle as shown in Fig. 2 so that the instrument will indicate correctly in any position.

The top plate 15 of the instrument is provided with a transparent cover, having air and water tight joints so that the indicating of the instrument will not be affected by weather conditions. A graduated scale 22 is attached to the top plate 15 of the instrument immediately underneath the point of the needle 19, so that the speed of the rotating armature and that of the rotating body connected thereto may be indicated.

When the armature rotates, as actuated by the body the speed of which it is desired to register, a change is produced in the direction of the magnetic field between the poles of the permanent magnet 3 by the cross magnetic field produced by the currents which flow in the conductors 9. The resultant magnetic field influences the soft iron plate 18 attached to the light shaft or spindle 16, thus causing the needle 19 to indicate upon the scale 22 the direction of the same, and consequently the speed of rotation.

As the magnet 3 is employed both to produce the magnetic field through the armature and produce the magnetic field across the space within the projecting conductors 9 of the rotating armature, it will be seen that any change in the strength of the permanent magnet 3 will not affect the direction of the resultant field produced since both the initial component of the field present in that space when the armature was at rest and likewise the deflecting component caused by the currents induced by the rotation of the armature are affected to the same extent.

The sensitiveness of the instrument can be adjusted over a wide range by sliding the magnet 3 up or down in the grooves 4 in the casing 1 and pole pieces 2. This adjustment of the magnets may be used for adapting the same instrument to suit a different range of speeds. When used as a speedometer for vehicles the same instrument and connecting gear may be adapted to indicate correct readings with vehicles having wheels of varying sizes.

In instruments where speeds of rotation in both directions are required the arrangement of bevel gears as shown in Fig. 4 may be employed, when either end of the shaft 23 may be connected to the rotating body according to the direction of rotation.

The instrument may be operated in the reverse direction without damage and advantage may be taken of this fact by so arranging the parts that the indicator needle is in the center of the graduated scale when the armature is at rest. The center of the scale is then zero and the scale is graduated upon either side for direct and reverse speeds of rotation.

I claim:—

1. A tachometer comprising a permanent magnet between the poles of which is mounted a rotatable armature core provided with projecting insulated conductors comprising a continuous winding, by which a secondary magnetic field is induced, a shaft and a piece of soft iron mounted on said shaft within the said secondary field, said shaft having an indicating needle, substantially as described.

2. In tachometers comprising a permanent magnet between the poles of which is mounted a rotatable armature core having insulated conductors in the form of a squirrel cage winding attached thereto, by which a secondary magnetic field is induced, a shaft and a piece of soft iron mounted on said shaft within the said secondary field, said shaft having an indicating needle substantially as described.

3. In tachometers comprising a permanent magnet between the poles of which is mounted a rotatable armature core having insulated conductors connected at their extremities to rings and being bent inward and then again bent parallel to the axis, by which a secondary magnetic field is induced, a shaft and a piece of soft iron mounted on said shaft within the said secondary field, said shaft having an indicating needle substantially as described.

4. In tachometers comprising a rotatable armature core having conductors forming an insulated continuous winding, an adjustable permanent magnet between the poles of which said core is mounted, by which a secondary magnetic field is induced, means for holding said magnet in its adjusted position relatively to the conductors of said rotatable armature core, a shaft and a piece of soft iron mounted on said shaft within said secondary field, said shaft having an indicating needle substantially as described.

5. In tachometers comprising a permanent magnet between the poles of which is mounted a rotatable armature core provided with insulated continuous winding by which a secondary magnetic field is induced, a shaft and a piece of soft iron mounted on said shaft within the said secondary field, said shaft having an indicating needle, and means for damping the movement of the needle, substantially as described.

6. In tachometers comprising a permanent magnet between the poles of which is mounted a rotatable armature core provided with insulated continuous winding by which a secondary magnetic field is induced, a shaft and a piece of soft iron mounted on said shaft within the said secondary field, said shaft having an indicating needle, and means for damping the movement of the needle, comprising a vane attached to the tail of the said needle and a box within which said vane moves with small clearance, substantially as described.

7. A tachometer comprising a casing 1, pole pieces 2, a permanent magnet 3, a rotatable armature core 6 having conductors 9 with their extremities connected by rings 11 and 13, a spindle 16 mounted in bearings 17 having a soft iron plate 18 and an indicating needle 19, a damping vane 20 working in a box 21 and a graduated scale 22, substantially as described, and as shown in the drawings.

In testimony, that I claim the foregoing as my invention, I have signed my name in presence of two subscribing witnesses.

EDWARD BYAM BROWN.

Witnesses:
CLEMENT A. HACK,
CYRIL WRIGHT.

---

Copies of this patent may be obtained for five cents each, by addressing the "Commissioner of Patents. Washington, D. C."